Sept. 8, 1942.     C. E. COCHRAN     2,295,076
ELECTRIC MOTOR DRIVE FOR INDUSTRIAL TRUCKS
Filed April 9, 1941     2 Sheets-Sheet 1

INVENTOR.
Clyde E. Cochran
BY Fay, Macklin, Gohrick and Williams
ATTORNEYS.

Sept. 8, 1942.  C. E. COCHRAN  2,295,076
ELECTRIC MOTOR DRIVE FOR INDUSTRIAL TRUCKS
Filed April 9, 1941  2 Sheets-Sheet 2

INVENTOR.
Clyde E. Cochran
BY Fay, Macklin, Golrick and Williams
ATTORNEYS

Patented Sept. 8, 1942

2,295,076

UNITED STATES PATENT OFFICE 2,295,076

ELECTRIC MOTOR DRIVE FOR INDUSTRIAL TRUCKS

Clyde E. Cochran, Cleveland, Ohio, assignor to The Elwell-Parker Electric Company Application April 9, 1941, Serial No. 387,623

2 Claims. (Cl. 74—305)

This invention relates, as indicated, to electric motors for industrial trucks, but has reference more particularly to motors which are especially adapted for use in industrial trucks of the type described in my copending application Serial No. 387,622, filed April 9, 1941.

In the aforesaid copending application, I have described an industrial truck having a turntable member which is driven by a motor 29. In order to avoid disposing such motor outside the upright members constituting the load elevator frame, in which position it not only obstructs the view alongside the truck as well as constitutes an element which might encounter obstructions during the operation of the truck, I have proposed placing of such motor entirely within the turntable structure and concealing such motor from view exteriorly of the truck.

I have found that motors of the type ordinarily used for this purpose are bulky, inefficient in operation, and generally wholly undesirable in appearance, and I have accordingly designed a motor which is compact, efficient in operation, neat in appearance and which is admirably adapted for use for the purpose referred to in said copending application.

I have, moreover, provided a motor, in which are incorporated, virtually as unitary parts of the motor, a magnetic brake as well as a speed reduction unit.

Other objects and advantages of the invention will be apparent during the course of the following description.

In the accompanying drawings, forming a part of this specification, and in which like numerals are employed to designate like parts through the same.

Figure 1:
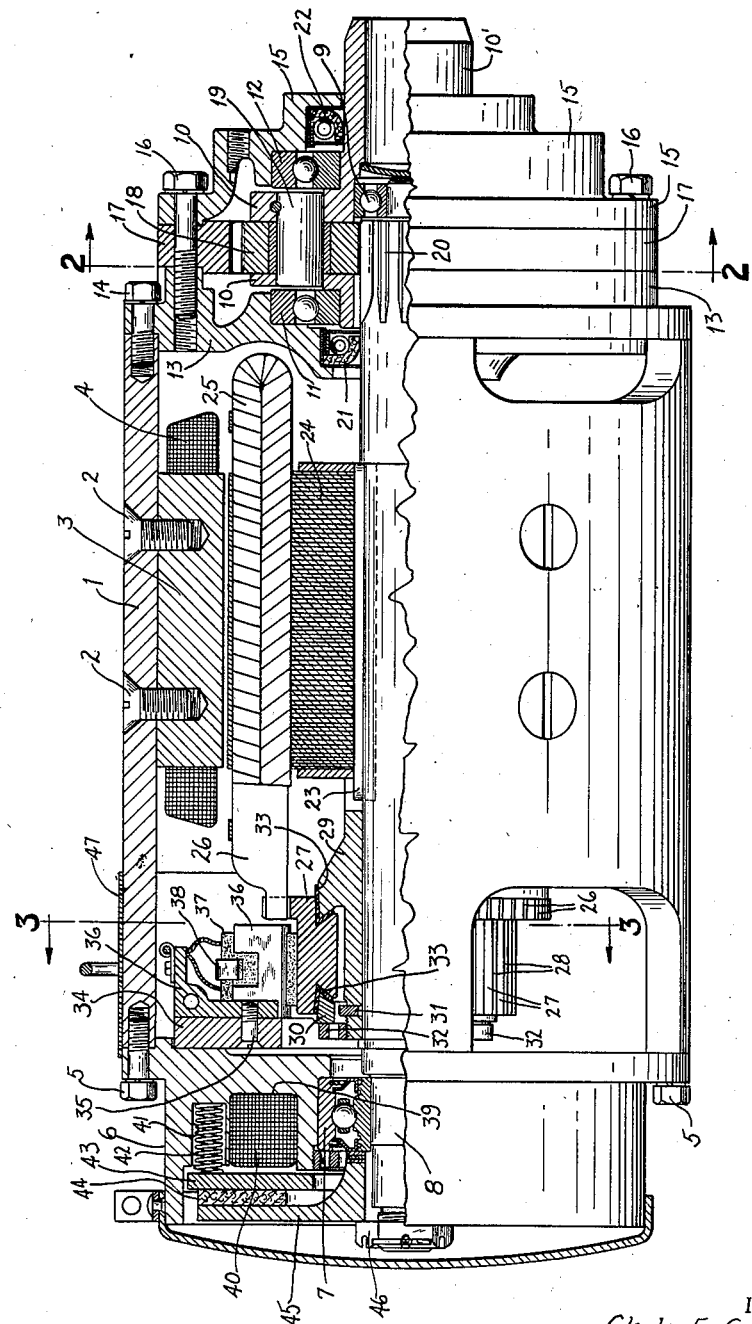
Fig. 1 is a view, partly in elevation, and partly in section, of a motor embodying the novel features of the invention.
Figure 2:
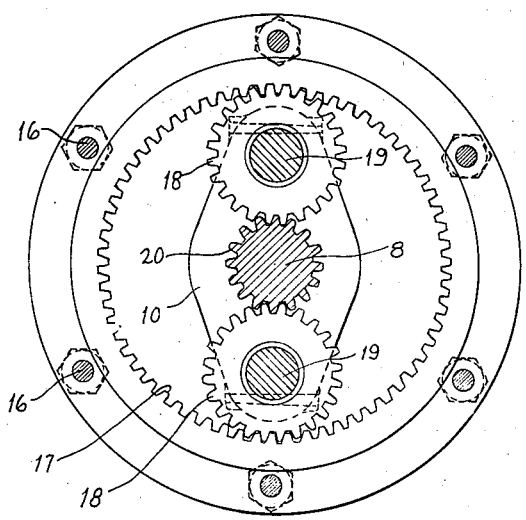
Fig. 2 is a cross-sectional view of the motor, taken on the line 2—2 of Fig. 1.

Referring more particularly to the drawings, the motor is seen to comprise a housing or magnet ring 1, to the interior surface of which are attached, as by means of screws 2, four circumferentially spaced magnet poles 3, having field coils 4 wound thereon. In a compound motor, two of the coils will be series wound coils and the alternate coils shunt wound.

Secured to one end of the ring 1, as by means of screws 5, is a brake housing 6, which will presently be described in detail, but which provides a seat for a roller bearing 7, in which is journalled one end of the armature shaft 8 of the motor. The opposite end of the shaft 8 is journalled in a roller bearing 9, which is seated in planetary spider 10, which, in turn, is rotatably mounted in roller bearings 11 and 12.

The bearing 11 is mounted in a cover plate 13, secured to one end of the ring 1 as by means of screws 14, while the bearing 12 is mounted in a cover plate 15, which is secured to the plate 13 as by means of screws 16. The plates 13 and 15 conjointly form a casing for a planetary gear reduction unit, consisting of an internal ring gear 17 which is secured to the cover plate 13 by the same screws 16 which secure the plate 15 to the plate 13, and a pair of planet pinions 18 mounted for rotation on pins 19 secured to the spider 10. The pinions 18 are in mesh with the teeth of the ring gear 17 and also in mesh with teeth 20 formed adjacent one end of the shaft 8. Oil seals 21 and 22 are provided to prevent leakage of oil supplied to the planetary gear reduction unit.

The spider 10 is formed to provide an extension 10' which is adapted to receive and have rigidly secured thereto the worm 28 described in my aforesaid copending application.

Figure 3:
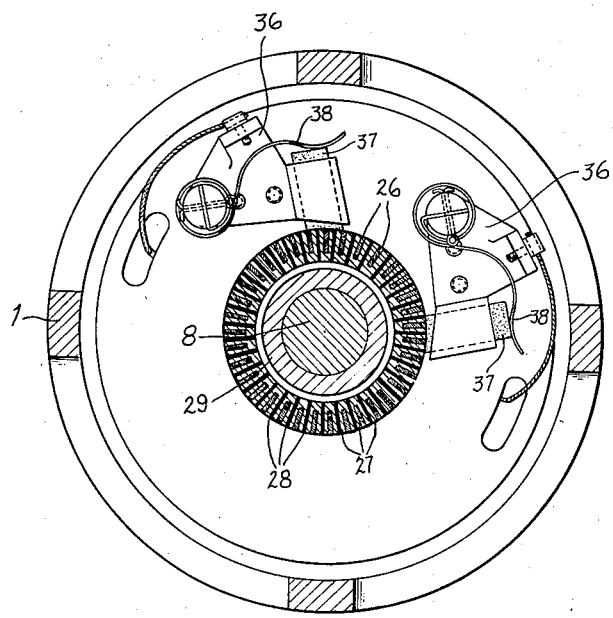
Fig. 3 is a cross-sectional view of the motor, taken on the line 3—3 of Fig. 1.

Secured to the shaft 8 intermediate the ends of the latter, as by a key 23, are the discs of an armature 24, which carries the armature coil 25, the leads 26 of which are, as clearly shown in Fig. 3, disposed in slots in commutator bars 27, which are insulated from each other by means of segments 28 of mica or other insulation material.

The shaft has also mounted thereon a commutator core consisting of a body portion 29 which surrounds the shaft, and a ring 30 which is locked against rotation with respect to the body 29 by means of a pin 31. The ring 30 and body 29 of the commutator core are held in assembled relation with respect to each other and with respect to the bars 27 by means of a nut 32 which is threadedly secured to the body 29 of the core. The bars 27 are maintained in insulated relationship with the commutator core by means of rings 33 of mica or the like.

Mounted on the inner face of the brake housing 6 is a brush holder supporting ring 34, to which is secured, as by means of screws 35, brush holders 36 having brushes 37 slidably mounted therein and resiliently maintained in engagement with the commutator by means of springs 38 secured to the brush holders.

The brake housing 6, to which reference has previously been made, has an annular recess 39, within which is disposed a magnet coil 40, and is further provided with a series of circumferentially spaced openings 41, within which are disposed springs 42, which, when the coil 40 is deenergized as a result of interrupting the motor current supply, are effective to cause the armature 43 of the brake to move to the left, as viewed in Fig. 1, causing the frictional material 44, such as cork, which is cemented thereto, to move into braking engagement with the brake proper 45. The brake 45 is keyed to the shaft 8 of the motor, and is maintained in position by means of a nut 46 secured to the end of the shaft. An electromagnetic brake is thus provided which is effective to automatically brake the armature shaft 8 immediately upon interruption of the current supply to the motor. When the current supply to the motor is resumed, the coil 40 becomes energized and withdraws the armature 43 from its braking position, against the tension of the springs 41.

A perforated commutator cover 47 may be provided, if desired.

In the operation of the motor, the motive power derived from rotation of the shaft 8, which rotates at relatively high speed, is transmitted to the extension 10' of the spider 10 through the planetary reduction gears, so that the extension 10', and the elements driven thereby are rotated at relatively low speed. The arrangement and construction of the planetary gearing for this purpose, is highly desirable.

It is thus seen that I have provided a motor of the back-geared type, which is highly compact and efficient in operation, in which a brake as well as a reduction gear unit are virtually incorporated as integral parts of the motor, and which motor is accordingly admirably adapted for use in industrial trucks of the character described in my aforesaid copending application.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. An electric motor of the character described, comprising a cylindrical casing, a motor shaft extending through said casing, a pair of spaced cover members removably secured to said casing at one end of the latter, a planetary spider disposed between said cover members and rotatable relatively to the same, said spider having a hollow extension extending through, and journaled in, one of said cover members, and a second hollow extension journaled in the other of said cover members, said hollow extensions being coaxially aligned with said shaft, a planetary ring gear interposed between said cover members, planetary pinions rotatably mounted on said spider and driven by said shaft, said pinions being in mesh with said ring gear.

2. An electric motor of the character described, comprising a cylindrical casing, a motor shaft extending through said casing, an inner cover plate secured to one end of said casing, a stationary internal ring gear adjacent said cover plate, an outer cover plate adjacent said ring gear, means securing said outer cover plate and ring gear to said inner cover plate, a stationary spider having two hollow extensions coaxially aligned with said shaft, said shaft extending through one of said hollow extensions and being journaled in the other of said hollow extensions, one of said hollow extensions being journaled in said inner cover plate, the other of said hollow extensions journaled in and extending through said outer cover plate, and planetary pinions rotatably mounted on said spider and in mesh with said shaft and ring gear.

CLYDE E. COCHRAN.